(12) United States Patent
Sivec et al.

(10) Patent No.: US 9,032,638 B2
(45) Date of Patent: May 19, 2015

(54) ENCODER READHEAD APPARATUS

(75) Inventors: Matjaz Sivec, Ljubljana (SI); Aljaz Ogrin, Ljubljana (SI); Peter Kogej, Rozna Dolina (SI)

(73) Assignees: RLS MERILNA TEHNIKA D.O.O, Komenda (SI); RENISHAW PLC, Wotton-under-edge (GB)

( * ) Notice: Subject to any disclaimer, the term of this patent is extended or adjusted under 35 U.S.C. 154(b) by 118 days.

(21) Appl. No.: 13/976,675

(22) PCT Filed: Jan. 6, 2012

(86) PCT No.: PCT/GB2012/000012
§ 371 (c)(1),
(2), (4) Date: Jun. 27, 2013

(87) PCT Pub. No.: WO2012/093253
PCT Pub. Date: Jul. 12, 2012

(65) Prior Publication Data
US 2013/0269198 A1      Oct. 17, 2013

(30) Foreign Application Priority Data

Jan. 7, 2011   (GB) .................................. 1100190.6

(51) Int. Cl.
G01D 5/347     (2006.01)
G01D 5/14      (2006.01)

(52) U.S. Cl.
CPC ............ *G01D 5/145* (2013.01); *G01D 5/34753* (2013.01)

(58) Field of Classification Search
USPC ............................ 33/1 N, 1 PT, 706, 707, 708
See application file for complete search history.

(56) References Cited

U.S. PATENT DOCUMENTS

| | | | |
|---|---|---|---|
| 4,063,086 A | 12/1977 | Hirose | |
| 4,766,375 A | 8/1988 | Nagaoka | |
| 5,842,283 A | 12/1998 | Yatsu et al. | |
| 5,945,824 A | 8/1999 | Obara et al. | |
| 6,327,791 B1 * | 12/2001 | Norcross et al. | ................ 33/706 |

(Continued)

FOREIGN PATENT DOCUMENTS

| | | |
|---|---|---|
| CN | 86101677 A | 10/1986 |
| CN | 101103206 A | 1/2008 |

(Continued)

OTHER PUBLICATIONS

Jun. 1, 2012 Written Opinion of the International Searching Authority issued in International Application No. PCT/GB2012/000012.

(Continued)

*Primary Examiner* — G. Bradley Bennett
(74) *Attorney, Agent, or Firm* — Oliff PLC (57) ABSTRACT

The present invention relates to an encoder readhead. The readhead includes a housing having an opening for capturing an encoder scale including an elongate rod having a substantially circular cross-section, the opening defining an axial direction along which a captured encoder scale can slide back and forth. A scale reader, which may include an array of Hall sensors, is provided for reading a portion of an encoder scale located in the opening. The housing includes an access portion that allows the encoder scale to be inserted into, and/or removed from, the opening by a relative movement between the housing and the encoder scale in a direction other than the axial direction.

15 Claims, 5 Drawing Sheets

(56) References Cited

U.S. PATENT DOCUMENTS

| | | | |
|---|---|---|---|
| 6,898,859 B2 | 5/2005 | Taniguchi et al. | |
| 7,569,808 B2 * | 8/2009 | Yoshioka | 33/1 PT |
| 2005/0246916 A1 | 11/2005 | Snyder et al. | |
| 2006/0201782 A1 | 9/2006 | Ishikawa et al. | |
| 2010/0162582 A1 | 7/2010 | Shiao et al. | |
| 2011/0094115 A1 * | 4/2011 | Schroter et al. | 33/1 PT |
| 2011/0316527 A1 * | 12/2011 | Dolsak et al. | 324/207.11 |
| 2012/0124848 A1 * | 5/2012 | Kirchberger et al. | 33/1 PT |
| 2014/0173920 A1 * | 6/2014 | Basler et al. | 33/1 PT |

FOREIGN PATENT DOCUMENTS

| | | |
|---|---|---|
| CN | 1997877 B | 12/2010 |
| EP | 1 724 557 A2 | 11/2006 |
| EP | 1 752 851 A1 | 2/2007 |
| EP | 1 878 931 A1 | 1/2008 |
| JP | H11-332181 A | 11/1999 |
| JP | 2004-144548 A | 5/2004 |
| JP | A-2010-84890 | 4/2010 |

OTHER PUBLICATIONS

May 16, 2011 British Search Report issued in British Patent Application No. GB1100190.6.

Jun. I, 2012 Written Opinion of the International Searching Authority issued in International Application No. PCT/GB2012/000012.

Jun. 1, 2012 International Search Report issued in International Application No. PCT/GB2012/000012.

Dec. 23, 2014 Office Action issued in Chinese Patent Application No. 201280004700.7.

\* cited by examiner

ENCODER READHEAD APPARATUS

The present invention relates to an encoder readhead for reading an associated encoder scale, and in particular to an improved encoder readhead that may be more easily attached to, and/or removed from, an associated encoder scale comprising a rod having a substantially circular cross-section.

Encoder readheads for measuring the position, or change in position, of an encoder scale in the form of a piston rod are known. Typically, such an encoder readhead comprises a rectangular housing having a central circular opening or passageway. During installation, one end of the piston rod is passed through the circular opening of the housing and the readhead is then secured to a stationary part of an apparatus. As the piston rod is extended and retracted in use, the rod moves back and forth through the opening in the housing. A readhead (e.g. an array of Hall sensors) is located within the housing in the vicinity of the circular opening and arranged to read the encoder scale (e.g. formed by a series of magnetic markings) that is provided on or near the surface of the piston rod. The position, or change in position, of the readhead relative to the associated piston rod can then be determined and this information used for controlling the apparatus.

The present inventors have found that a disadvantage of such known arrangements is the necessity for at least one end of the piston rod to be free in order to install or remove the readhead. In particular, this means that the mechanical apparatus incorporating the piston needs to be disassembled if the readhead needs to be repaired or replaced.

In the field of machine tools, it is known to provide an I-shaped track rail onto which a sliding guide is mounted. Heavy mechanicals part are attached to the sliding guide and moved back and forth along the rail. EP1878931 describes a sliding guide arrangement that may be attached to an intermediate part of the track. In the field of encoders, encoder tapes and associated tape readers are known. For example, US2005/0246916 describes a encoder tape reader system that comprises a reader and a shoe to support the tape whilst it is being read. The tape may be slid into a side opening of the tape reader system and supported by the shoe arrangement.

According to the present invention, there is provided an encoder readhead that comprises: a housing having an opening for capturing an encoder scale comprising an elongate rod having a substantially circular cross-section, the opening defining an axial direction along which a captured encoder scale can slide back and forth; and a scale reader for reading a portion of an encoder scale located in the opening, wherein the housing includes an access portion that allows the encoder scale to be inserted into, and/or removed from, the opening by a relative movement between the housing and the encoder scale in a non-axial direction (i.e. a direction other than the axial direction).

The present invention thus provides an encoder readhead comprising a housing. The housing defines an opening or passageway in which an encoder scale in the form of a rod having a circular cross-section can be captured, thereby attaching the encoder readhead to the encoder scale. The opening is preferably an elongate passageway or channel (e.g. a substantially cylindrical channel) that defines an axial direction along which the captured encoder scale can slide back and forth. The longitudinal axis of the associated encoder scale, when captured in the opening, preferably substantially coincides with the axial direction of the opening. The housing thus captures the encoder scale in the opening in a manner that substantially prevents lateral (side to side) motion of the encoder scale relative to the readhead but permits the captured encoder scale to slide back and forth relative to the readhead (i.e. axial motion is allowed).

The readhead of the present invention also comprises a scale reader for reading a portion of an encoder scale located in the opening. The scale reader and encoder scale may be of any suitable type. For example, the encoder scale may comprise a series of magnetic markings that can be measured using a magnetic scale reader. Further details of preferred types of scale reader and encoder scale are described in more detail below.

The encoder readhead of the present invention also includes a housing with an access portion that allows the encoder scale to be inserted into, and/or removed from, the opening in a non-axial direction. Preferably, the access portion allows the encoder scale to be inserted into, and/or removed from, the opening by a relative movement between the housing and the encoder scale in a direction substantially perpendicular to the axial direction (i.e. from a radial direction). In other words, the geometry of the housing in the section perpendicular to the axial direction of the opening allows the readhead to be attached to the rod of the encoder scale from a radial direction.

The use of an encoder readhead of the present invention, in contrast to prior art readheads, means that there is no need to pass the opening formed in the housing over an end of the encoder scale (e.g. piston rod) in order to attach it to, or remove it from, the encoder scale. Instead, the access portion allows the encoder readhead to be attached to, and/or removed from, a side of an encoder scale. The encoder readhead of the present invention thus has the advantage that it can be attached to (and/or detached from) the encoder scale whilst each end of that encoder scale remains mechanically connected to any mechanical apparatus in which it is installed. This has the advantage of making encoder readhead installation, repair and servicing easier to perform. In particular, the encoder readhead of the present invention can be attached to, and detached from, a piston rod of a machine without having to disassemble the machine to mechanically unload the piston rod.

It should be noted that all references herein to motion of the encoder readhead or encoder scale are intended to describe the relative motion of such components, unless explicitly stated to the contrary. For example, referring to the encoder scale sliding through the opening in the readhead or to the readhead moving along the encoder scale is, unless explicitly stated to the contrary, not intended to imply that a selected one of the components is stationary but instead refers to the relative motion between the encoder scale and readhead.

The access portion may be provided in a variety of ways. For example, a hinged portion may be attached to the housing that can be opened and closed to provide access to the opening. The housing may also be formed as a number of parts or sections and the access portion may comprise a means for detaching one or more of these parts to provide the required access to the opening. Preferably, the access portion comprises a gap or slit formed in a side wall of the housing. The gap preferably extends along the length of the opening. Advantageously, the gap provides side (radial) access to the opening that allows the scale member to be inserted into, and/or removed from, the opening through the gap. The gap can thus be passed or slid over the side of the encoder scale thereby allowing the opening to capture the encoder scale and/or allowing the encoder scale to be removed from the housing.

Advantageously, the housing defines a gap having at least one elastically deformable wall portion. The gap may be slightly smaller than the relevant dimension of the encoder scale portion that is to be passed therethrough. The at least one elastically deformable wall portion preferably permits the gap to expand (e.g. when forced into engagement with an encoder scale), thereby allowing the encoder scale to pass through it. The gap advantageously comprises a fluted entrance that causes the gap to expand when pressed into engagement with an encoder scale. In this manner, the gap can be forced to expand (i.e. by elastic deformation of said at least one elastically deformable wall portion) by the action of pressing the encoder scale into the gap. Advantageously, when the encoder scale is pressed into the gap with a certain force it passes through the gap (e.g. following elastic expansion of the gap). Preferably, when the encoder scale has passed through the gap it is then captured in the opening. This capturing process advantageously occurs by a snap-fit or clip-on type of action. The encoder scale may also be detached from the readhead in a similar manner. For example, a lateral detachment force may be applied between the readhead and encoder scale in the direction of the gap. After the lateral force exceeds a certain threshold, the gap elastically expands and the encoder scale is released from the opening.

Advantageously, the housing defines an opening having at least one elastically deformable wall portion. If the housing defines a gap having at least one elastically deformable wall portion, the gap and opening may share one or more common elastically deformable portions. In other words, a single elastically deformable portion may provide an elastically deformable wall of the gap and an elastically deformable wall of the opening. Preferably, the at least one elastically deformable wall portion of the opening is biased into engagement with an encoder scale located within the opening thereby capturing the encoder scale.

The encoder readhead may comprise one or more rollers for contacting the encoder scale (i.e. to provide rolling contact with the elongate rod). In a preferred embodiment, the encoder readhead comprises a slider (e.g. a plastic slider) that has one or more surfaces that define the opening. The slider thus provides sliding contact with the rod. A spring, for example a leaf spring, may also be included. The spring is preferably arranged to bias the one or more surfaces of the slider into contact with an encoder scale thereby capturing the encoder scale in the opening. The slider may include the one or more elastically deformable wall portions that are mentioned above. In such a case, the spring may act on such elastically deformable wall portions and bias their inner surfaces into contact with the encoder scale.

Advantageously, a captured encoder scale is arranged to fit tightly or snugly within the opening. For example, the opening may have a radius that is substantially the same as, or slightly less than, the radius of the rod that forms the encoder scale. Conveniently, the captured encoder scale is held tightly enough within the opening to minimise lateral movements, but not so tightly as to prevent the required sliding motion between the encoder readhead and encoder scale. The force with which the encoder scale is held within the opening is preferably substantially constant, thereby ensuring the sliding friction remains substantially invariant with use. Preferably, the encoder scale is held in the opening against one or more surfaces of the opening that have a fixed position relative to the scale reader. Conveniently, such fixed position surfaces may be adjacent the scale reader. As mentioned above, it is preferred that the encoder scale is forced into engagement with the fixed position surfaces by one or more biasing surfaces; the force applied by the biasing surface(s) to the encoder scale preferably being substantially constant.

In this manner, a substantially constant ride-height between the scale reader and the associated encoder scale can be maintained as they slide back and forth relative to one another. This should be contrasted to a typical prior art readhead arrangement in which a readhead casing affixed to the apparatus includes a bushing that carries a scale reader and pushes it into engagement with the encoder scale. The bushing tolerances thus define the required ride-height tolerance meaning that it is typically necessary to provide substantially higher ride-height tolerances when using a prior art readhead of this type than are necessary when employing the arrangement of the present invention.

As explained above, the opening may be defined by one or more surfaces that engage and capture an encoder scale. Advantageously, at least one such surface comprises a material having a low coefficient of friction. For example, at least some of the surfaces that engage the encoder scale may be formed from a low friction plastic material, such as PA6. A lubricant, such as oil, or a surface coating may conveniently be provided to reduce friction. These surfaces may thus provide the slider described above.

The present invention can be used with any type of encoder scale comprising a rod or rod-like element that has a substantially circular cross-section. Preferably, the encoder scale is elongate and forms part of a linear encoder. Advantageously, the encoder scale also performs a load bearing function. For example, the encoder scale may comprise a piston rod for use in hydraulic or pneumatic actuators. The opening is preferably configured for use with the required encoder scale. For example, the shape and dimensions (e.g. diameter) of the opening are preferably matched to the encoder scale with which it is to be used. The cross-section of the opening may be substantially circular, part circular and/or include a plurality of surfaces spaced apart in a circular arrangement. The opening may completely surround a section of a captured encoder scale. Advantageously, the opening only partially surrounds a captured encoder scale; e.g. one or more gaps or slots of the type described above may be provided.

The scale reader provided in the readhead may be of any suitable type. The scale reader may be an optical scale reader for reading optical markings on an associated optical scale. Advantageously, the scale reader is a magnetic scale reader. For example, the scale reader may comprise at least one magnetic sensor. Advantageously, the scale reader comprises a plurality of magnetic sensors (e.g. Hall sensors) that may be arranged in a linear array. In such an example, the scale reader can read the magnetic scale markings provided on an associated encoder scale. The associated encoder scale may include so-called active magnetic markings; for example, a series of magnets arranged with alternating north and south poles. Preferably, the encoder scale comprises a so-called passive magnetic scale in which the scale comprises a series of markings or regions that have a different magnetic permeability than the surrounding material. In such a passive magnetic system, a magnet may be provided in the readhead; the magnetic sensors can then be used to sense the change in the magnetic field generated by the magnet in the presence of the regions of different magnetic permeability of the encoder scale. A hard, protective, coating (e.g. chrome) may be applied to the surface of the encoder scale. The scale reader may be arranged to read incremental encoder scale and/or absolute encoder scale.

The encoder readhead advantageously comprises a mounting for attaching the encoder readhead to an associated machine. Preferably, the mounting is stiff in a direction parallel to the axial direction. Advantageously, the mounting is compliant in one or more directions (or all directions) non-parallel to the axial direction. In this manner, the mounting introduces some play to account for mechanical stresses and strains within the machine in which the encoder readhead is mounted. Importantly, however, motion in the axial direction is substantially prevented thereby ensuring the effect of such play on the positional information being measured by the encoder readhead is minimised. Preferably, the mounting of the readhead only carries the mechanical load of the readhead. In other words, the readhead and mounting are preferably arranged not to form part of a load bearing path of the machine in which it is installed. The encoder scale may be a piston rod; in this case a mechanical force may be passed through the piston rod but this force is preferably not transmitted through the readhead (i.e. the readhead preferably remains separate from the parts of the machine that carry the mechanical load).

The present invention also extends to encoder apparatus that comprises both an encoder readhead as described above and an encoder scale. The encoder scale may have any of the properties outlined above. The present invention also extends to a machine comprising the encoder apparatus. The machine may comprise a piston rod that forms the encoder scale. In use, the piston rod may then also carry a mechanical load.

The present invention also extends to a method of attaching an encoder readhead to an encoder scale comprising an elongate rod having a substantially circular cross-section, the encoder readhead comprising a housing having an opening for capturing the encoder scale and the encoder scale being dimensioned to be retained within the opening, wherein the encoder scale can be inserted into, and/or removed from, the opening by a relative movement between the housing and the encoder scale in a direction other than the axial direction (e.g. from a radial direction). The encoder readhead and/or encoder scale may have any of the features described above.

Also described herein is an encoder readhead, comprising: a housing having an opening for attaching the encoder readhead to an associated encoder scale, the opening, in use, capturing the encoder scale and allowing the encoder scale to slide back and forth through the opening, and a scale reader for reading a portion of an encoder scale located in the opening, wherein the housing includes an access portion that permits the housing to be attached to, and/or detached from, the associated encoder scale from a side thereof. The encoder readhead and/or encoder scale may have any of the features described above.

Also described herein is an encoder readhead comprising a casing that is attachable to an associated encoder scale and a scale reader for reading a portion of an encoder scale located adjacent to the casing, wherein the casing including means for slideably capturing the encoder scale, said means allowing the readhead to be attached to, and/or detached from, the associated encoder scale from a side thereof.

There is also described herein an encoder readhead that comprises: a housing having an opening for capturing an encoder scale, the opening defining an axial direction along which a captured encoder scale can slide back and forth; and a scale reader for reading a portion of an encoder scale located in the opening, wherein the housing includes an access portion that allows the encoder scale to be inserted into, and/or removed from, the opening by a relative movement between the housing and the encoder scale in a non-axial direction (i.e. a direction other than the axial direction). The housing defines an opening or passageway in which an appropriately dimensioned encoder scale (e.g. an encoder scale in the form of a rod having a circular cross-section) can be captured, thereby attaching the encoder readhead to the encoder scale. Any type of encoder scale may be provided. The encoder scale may be elongate and form part of a linear encoder. The encoder scale may have a square, circular, or rectangular cross-section.

The invention will now be described, by way of example only, with reference to the accompanying drawings in which.

Figure 1:
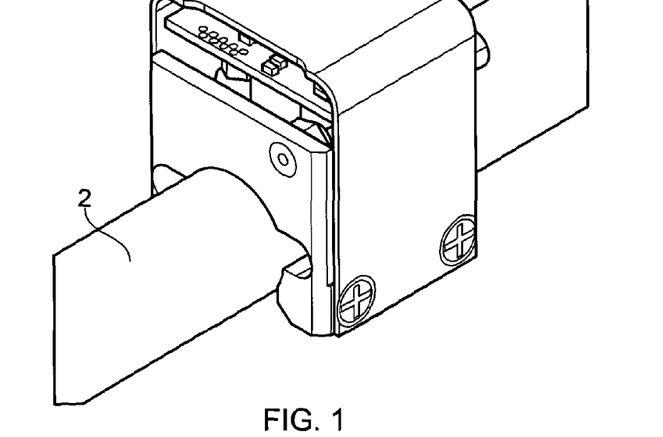
FIG. 1 shows a perspective view of a readhead of the present invention attached to a piston rod.

Referring to FIG. 1, there is shown a schematic view of a linear encoder system of the present invention that comprises an encoder scale in the form of a rod 2 having a circular cross-section. An encoder readhead 4 is attached to, and can slide back and forth along, the rod 2. The rod 2 has scale marking (not shown) formed along its length and the encoder readhead 4 comprises a scale reader (not shown) for reading the scale markings.

Figure 2:
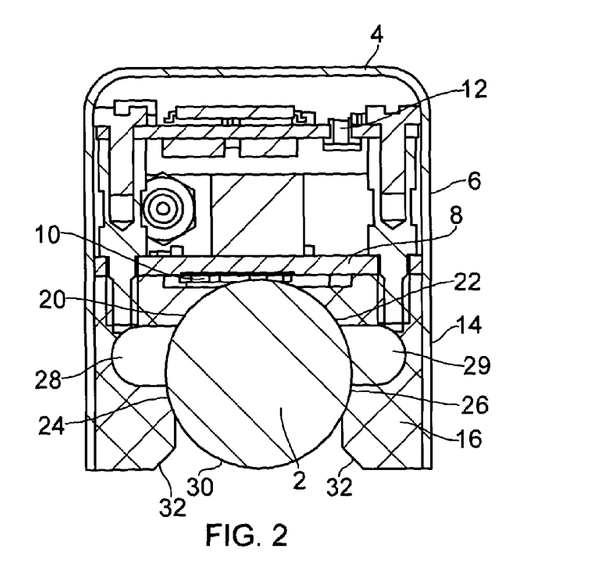
FIG. 2 shows a cross-section though the readhead and piston rod of FIG. 1.

FIG. 2 shows a cross-section through the linear encoder system of FIG. 1. The encoder readhead 4 comprises a housing 6 that contains a first printed circuit board (PCB) 8 that carries a scale reader 10 comprising a plurality of Hall sensors. The housing also contains a second PCB 12 comprising a processor for processing the signals generated by the scale reader. A cable, not shown, is provided for carrying positional information from the second PCB 12 of the readhead to an associated interface or controller.

The housing 6 comprises an outer U-shaped leaf spring 14. A slider 16 made from a flexible plastic material is compressed between the (lower) free ends of the leaf spring 14. The slider 16 comprises a first pair of internal surfaces 20 and 22 and a second pair of internal surfaces 24 and 26. The internal surfaces 20, 22, 24 and 26 are part circular and together define an elongate channel or opening 18 through the readhead that is dimensioned to capture the associated circular rod 2. Slots 28 and 29 are also provided in the slider 16 between opposed ones of the first and second pairs of internal surface. The slots 28 and 29 act as points of (elastic) weakness in the slider such that the spring force applied by the surrounding U-shaped leaf spring 14 biases each of the second pair of internal surfaces 24 and 26 towards the rod 2. The bias force is selected to be sufficient to ensure the slider portion 16 securely captures the rod 2 (i.e. ensuring the rod 2 stays attached to the readhead 4 during normal use) but low enough to permit the rod 2 to slide back and forth through the opening 18.

As will be explained in more detail below, an access portion is provided in the form of a gap 30 formed along the length of the opening 18. The gap 30 is located between the second pair of internal surfaces 24 and 26 and allows the rod 2 to be inserted into, and removed from, the opening (i.e. through the gap 30). The second pair of internal surfaces 24 and 26 are, as explained above, spring biased and can be separated by a sufficient amount to permit insertion/removal of the rod 2. External angled edges 32 are provided on the outer facing surface of the slider 16 to aid such separation of the internal surfaces 24 and 26 during rod insertion into the opening 18. The gap 30 of the readhead 4 can thus be pressed against the side of the rod 2, thereby causing the internal surfaces 24 and 26 to separate whereupon the rod can enter the opening 18. Once located in the opening 18, the internal surfaces 24 and 26 spring back and engage the rod thereby capturing it.

Figure 3:
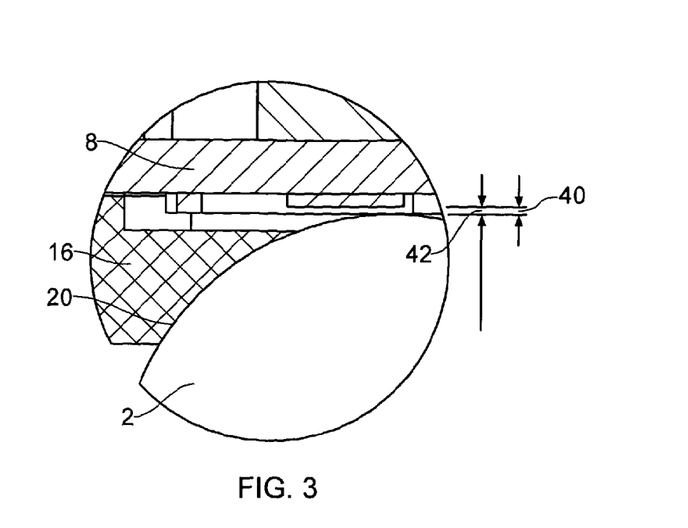
FIG. 3 illustrates the rideheight of the sensor provided within the readhead shown in FIGS. 1 and 2.

FIG. 3 shows an expanded view of the rod 2 and scale reader 10 that are described above with reference to FIG. 2. In particular, it will now be described also with reference to FIG. 3 how readhead 4 allows a substantially invariant gap to be maintained between the scale formed on the rod 2 and the scale reader 10 within the readhead.

As would be appreciated by a person skilled in the art, the separation between the scale reader 10 of the readhead and the scale formed on the rod 2 (such separation being called the sensing distance 40 hereinafter) is different for different types of sensors and when reading scales of different pitch or grating period. For higher accuracy scales, the scale pitch is small and sensing distance tolerances may be very low.

For the above described magnetic scale reader 10 that comprises a plurality of Hall sensors, the sensing distance may be defined as 0.2 to 0.4 times the grating period of the associated scale formed in or on the rod 2. A grating period of 0.5 mm thus defines a sensing distance of 0.1 to 0.2 mm. It should be noted that the sensing distance is the distance between Hall sensors of the scale reader and the magnetic markings formed on the rod. The actual physical gap (or ride-height 42) between the scale protection layer and the readhead may need to be as low as 0.02 mm when additional materials located between the hall sensor and scale markings (such as edges of the readhead and any tough surface coatings, such as hard chrome, that are provided on the rod) are taken into account.

To provide a stable signal that can provide reliable position information, it is preferred that the optimum ride-height is maintained along the whole rod length. It is also preferred, to prevent damage, for there to be no contact between the first PCB 8 that carries the scale reader 10 and the rod 2; i.e. the ride-height is preferably set to be greater than zero. It is also important that the correct ride-height is maintained in harsh environments when the encoder system is subjected to vibrations, shocks and temperature variations.

As described above, the readhead is attached to the rod by the clamping force applied by the U-shaped leaf spring 14 through the slider 16. This arrangement forces the rod 2 into tight engagement with the first pair of internal surfaces 20 and 22 that have a substantially invariant position relative to the first PCB 8. In this manner, the slider 16 locks or sets the distance between the rod 2 and the Hall sensors provided on the first PCB 8. The desired ride-height can be predefined during assembly of the first PCB 8 and the slider 16.

The slider 16 is maintained in sliding contact with the rod, and is therefore preferably made of material with good sliding properties. It may, for example, comprise the plastic PA6 with dispersed oil. This provides a low coefficient of friction and a low amount of wear is experienced when sliding against a protective chrome layer of the rod 2. When the rod 2 is captured in the opening 18 by the slider 16, the only free direction of movement of the rod 2 is axial.

The present inventors have recognised the need of machine operators to have an easy way of maintaining and servicing an installed readhead. This is particularly the case for an encoder scale as described above that takes the form of a piston rod in an actuator. Rather than using prior art readheads that must be installed and removed over an end of the rod, the present invention allows the installation or replacement of a readhead on a rod from a radial direction (i.e. from the side of the rod). This means the need to uncouple the rod from the mechanical equipment in which it is installed is removed thereby considerable easing the replacement or servicing procedure. It should, however, be noted that the readhead could still be installed or removed over the end of a rod (i.e. from the axial direction) if desired.

Figure 4:
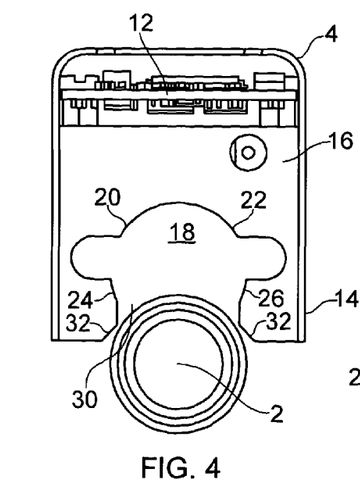
FIG. 4 shows a readhead prior to it being snap-fitted onto a piston rod, FIG. 5 the readhead of FIG. 4 after it has been snap-fitted onto a piston rod.
Figure 5:
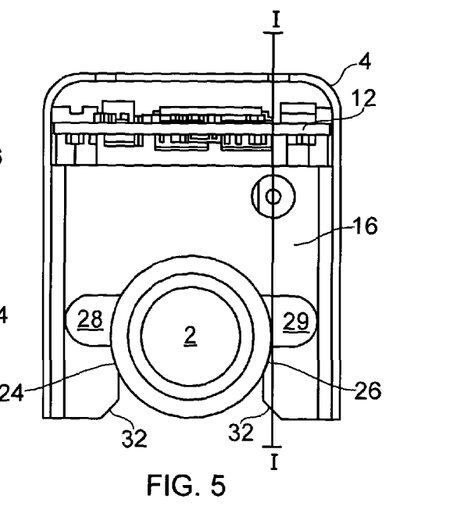
Figure 6:
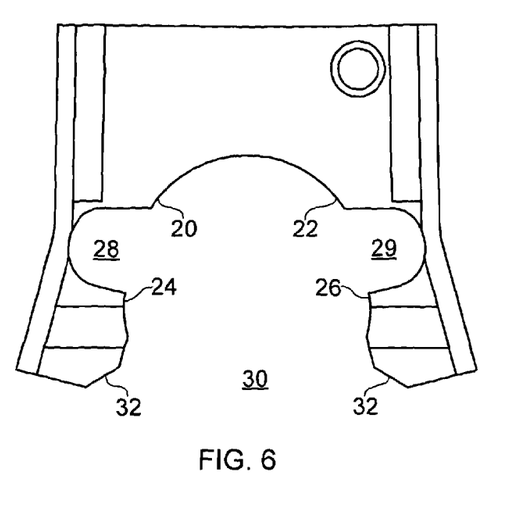
FIG. 6 illustrates the elastic deformation that provides the snap-fit attachment.

Referring now to FIGS. 4 to 6, the specific ability to mount and demount the above described encoder readhead 4 from a rod 2 will be illustrated.

FIG. 4 shows cut through view of the readhead 4 prior to it being mounted to the rod 2. The slider 16 provides an opening 18 (which is empty in FIG. 4) for capturing the rod 2. The opening 18 is defined by the first and second pairs of internal surfaces 20, 22, 24 and 26 that are dimensioned, in the absence of an inserted rod, to have a radius that is slightly smaller than that of the rod. The gap 30 located between the second pair of internal surfaces 24 and 26 allows the rod 2 to be inserted into the opening. The external angled edges 32 provided on the outer facing surfaces of the slider 16 are arranged to engage the rod prior to insertion.

Forcing the rod against the external angled edges 32 causes the second pair of internal surfaces 24 and 26 to separate from one another (i.e. the bias provided the leaf spring is overcome) and the rod 2 passes through the expanded gap 30. Once the rod 2 has entered the opening 18, the second pair of internal surfaces 24 and 26 spring back and engage the rod 2 thereby capturing it in the opening. This can be seen to provide a clip-on or snap fit action.

FIG. 5 shows the rod 2 captured in the opening 18 of the slider 16. FIG. 6 shows, with the associated rod 2 omitted for clarity, how the gap 30 in the slider 16 can be expanded to permit the rod 2 to pass into (or back out of) the opening 18.

Figure 7:
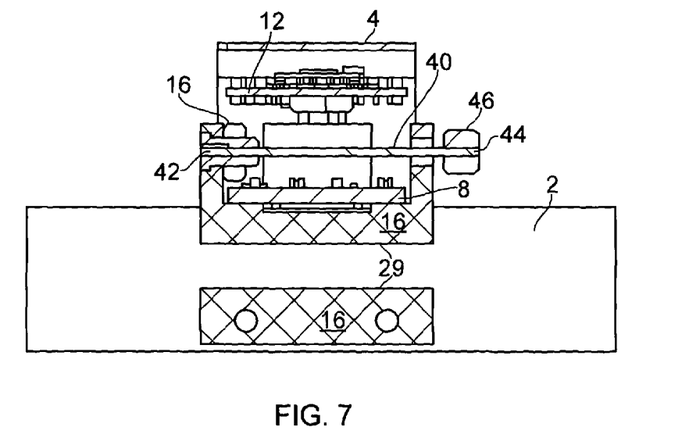
FIG. 7 illustrates how the readhead can be secured to the stationary part of a machine.

A piston rod in an actuator generally has some play, which is typically greater than the tolerance in the sensing distance. FIG. 7 shows how the above described readhead 4 can be attached to a fixed body (e.g. an actuator flange) of the mechanical system in which it is to be used.

FIG. 7 is a view through the readhead 4 and rod 2 in the plane 1-1 that is shown in FIG. 5. The coupling or mounting between the readhead 4 and the fixed body comprises a thin flexible rod 40 having a first end 42 fixed to a point on the slider 16 and a second end 44 that carries and adapter element 46. The adapter element 46 can be affixed to the fixed body of the machine (e.g. the actuator flange or cylinder body). The thin flexible rod 40 can bend in all directions, except along its elongate axis (i.e. it is stiff axially). This arrangement prevents any substantial movement of the readhead 4 in the axial direction (i.e. along the direction in which relative movement of the readhead 4 and rod 2 is to be measured) whilst still allowing movement of the readhead in radial directions (i.e. which does not affect the measurements taken by the system). In this manner, any play in the movement of the rod does not affect the sensing distance.

The skilled person would appreciate, based on the above teachings, the various alternative arrangements that could be used to implement the present invention. Some examples of such alternatives will now be described with reference to FIGS. 8 to 10.

Figure 8:
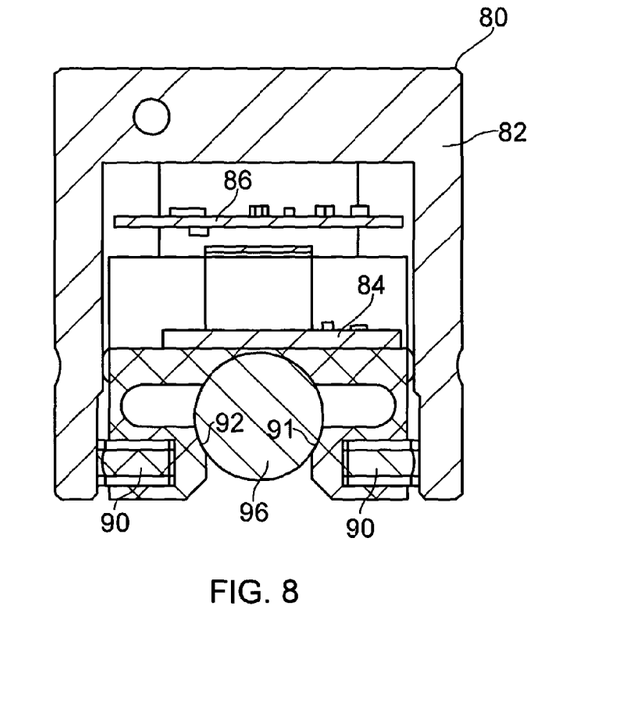
FIG. 8 shows an alternative readhead comprising coil springs to provide the bias for gripping the piston rod.

Referring to FIG. 8, an alternative encoder readhead 80 is shown that comprises a rigid housing 82 that comprises a first PCB 84 comprising a scale reader. A second PCB 86 comprising a processor is also provided. A plastic slider 88 is also included that is similar to the slider 16 described in the examples outlined above. The readhead 80, however, includes coil springs 90 that act to bias surface 92 and 94 into contact with the piston rod 96; these coil springs 90 provided the biasing force that is provided by the U-shaped leaf spring 14 in the above described embodiments.

Figure 9:
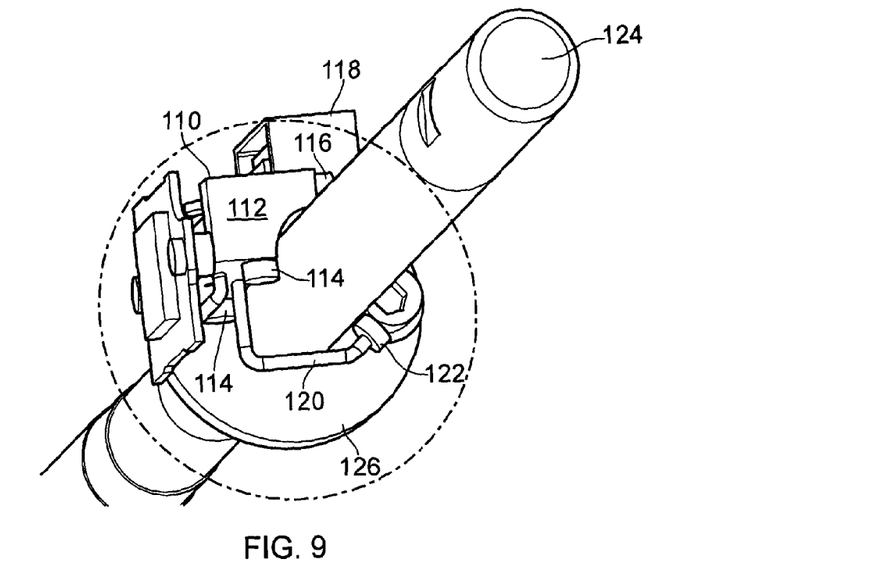
FIG. 9 shows an readhead in which the slider is replaced by a carriage comprising roller bearings.
Figure 10:
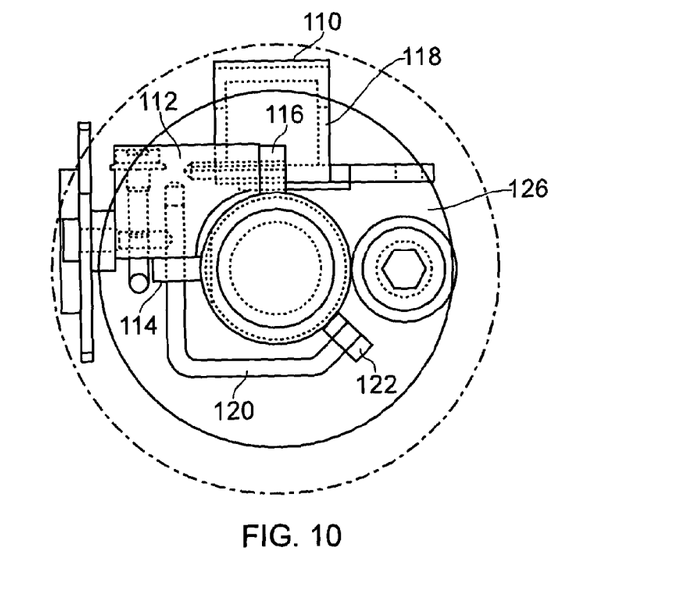
FIG. 10 is a sectional view through the readhead of FIG. 9.

FIG. 9 shows a further encoder readhead 110 and FIG. 10 shows a section through the readhead 110. The readhead 110 comprises a housing and opening that are defined by a carriage 112 and various spaced apart rollers. In particular, the carriage 112 comprises a first pair of rollers 114 that are radially separated from a second pair of rollers 116. A scale reader unit 118 is also attached to the carriage. A spring loaded arm member 120 protrudes from the carriage and carries a single roller 122 at is distal end. A piston rod 124 is captured in the opening formed between the first and second pair of rollers 114 and 116 and the roller 122. The spring loaded arm member 120 can be deflected sufficiently to allow the readhead 110 to be clipped on and off of the piston rod 124 as required, thereby forming an access portion. Once clipped on to the piston rod, the readhead 110 may also be attached (e.g. screwed) to a clutch washer 126 that remains slideably attached to the piston rod 124. It should also be noted that any one or more of the rollers forming the first and second pair of rollers 114 and 116 and roller 122 could be replaced with one or more sliding surfaces.

Although a magnetic encoder system is described above, the invention could be applied to any type of encoder system. For example, the invention could be used as part of an optical encoder system.

The invention claimed is:

1. An encoder readhead, comprising:
 a housing having an opening for capturing an encoder scale comprising an elongate rod having a substantially circular cross-section, the opening defining an axial direction along which a captured encoder scale can slide back and forth; and
 a scale reader for reading a portion of an encoder scale located in the opening,
 wherein the housing includes an access portion that allows the encoder scale to be inserted into, and/or removed from, the opening by a relative movement between the housing and the encoder scale in a non-axial direction.

2. An encoder readhead according to claim 1, wherein the access portion allows the encoder scale to be inserted into, and/or removed from, the opening by a relative movement between the housing and the encoder scale in a direction substantially perpendicular to the axial direction.

3. An encoder readhead according to claim 1, wherein the access portion comprises a gap formed in a side wall of the housing, the gap providing side access to the opening that allows the scale member to inserted into, and/or removed from, the opening through the gap.

4. An encoder readhead according to claim 3, wherein the housing defines a gap having at least one elastically deformable wall portion that permits the gap to expand thereby allowing the encoder scale to pass therethrough.

5. An encoder readhead according to claim 4, wherein the gap comprises a fluted entrance that causes the gap to expand when pressed into engagement with a encoder scale.

6. An encoder readhead according to claim 4, wherein when the encoder scale is forced into engagement with the gap it passes through the gap and is captured in the opening by a snap-fit action.

7. An encoder readhead according to claim 1, wherein the housing defines an opening having at least one elastically deformable wall portion, wherein the at least one elastically deformable wall portion of the opening is biased into engagement with an encoder scale located in the opening thereby capturing the encoder scale.

8. An encoder readhead according to claim 7, comprising a leaf spring and a an inner slider having one or more surfaces that define the opening, wherein the leaf spring is arranged to bias the one or more surfaces into contact with an encoder scale thereby capturing said encoder scale in the opening.

9. An encoder readhead according to claim 1, wherein a captured encoder scale fits snugly within the opening and is held against one or more surfaces having a fixed position relative to the scale reader thereby maintaining a substantially constant ride-height between the scale reader and the associated encoder scale as they slide back and forth relative to one another.

10. An encoder readhead according to claim 1, wherein the opening comprises at least one surface for engaging a captured encoder scale, wherein said at least one surface comprises a material having a low coefficient of friction.

11. An encoder readhead according to claim 1, wherein the opening only partially surrounds a captured encoder scale.

12. An encoder readhead according to claim 1, wherein the scale reader comprises at least one magnetic sensor for reading an encoder scale comprising a series of magnetic markings.

13. An encoder readhead according to claim 1, comprising a mounting for attaching the encoder readhead to a device, wherein the mounting is substantially stiff in a direction parallel to the axial direction and compliant in one or more directions non-parallel to the axial direction.

14. Encoder apparatus comprising; an encoder readhead according to claim 1 and an encoder scale comprising an elongate rod having a substantially circular cross-section.

15. A machine comprising encoder apparatus according to claim 14, the machine comprising a piston rod that forms the encoder scale, wherein, in use, the piston rod also carries a mechanical load.

\* \* \* \* \*